US009536105B2

(12) United States Patent
Boldyrev et al.

(10) Patent No.: US 9,536,105 B2
(45) Date of Patent: Jan. 3, 2017

(54) METHOD AND APPARATUS FOR PROVIDING DATA ACCESS VIA MULTI-USER VIEWS

(75) Inventors: Sergey Boldyrev, Söderkulla (FI); Mika Juhani Mannermaa, Burlington, MA (US); Dmitry Kolesnikov, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 606 days.

(21) Appl. No.: 13/359,182

(22) Filed: Jan. 26, 2012

(65) Prior Publication Data
US 2013/0198235 A1    Aug. 1, 2013

(51) Int. Cl.
G06F 21/62       (2013.01)
G06F 17/30       (2006.01)

(52) U.S. Cl.
CPC ..... G06F 21/6227 (2013.01); G06F 17/30383 (2013.01)

(58) Field of Classification Search
USPC ....... 707/694, 781, 783, 784, 785, 786, 787, 707/788, 999.9
See application file for complete search history.

(56) References Cited

U.S. PATENT DOCUMENTS 6,085,191 A *   7/2000  Fisher et al. ................. 707/737
6,236,996 B1    5/2001  Bapat et al.

2005/0120054 A1   6/2005  Shulman et al.
2007/0245409 A1  10/2007  Harris et al.
2008/0086758 A1*  4/2008  Chowdhury et al. ............. 726/2
2010/0070461 A1   3/2010  Vella et al.
2010/0257544 A1  10/2010  Kleban
2011/0022596 A1   1/2011  Wei et al.

FOREIGN PATENT DOCUMENTS

WO    WO-2007/047846 A2    4/2007

OTHER PUBLICATIONS

Majkic et al. "Kleisli Category and Database Mappings", ACM, vol. 4, Issu 5, Oct. 2010. http://dl.acm.org/citation.cfm?id=1868389.*
M. Ion et al., "Enforcing Multi-user Access Policies to Encrypted Cloud Databases", Abstract Only, < http://dl.acm.org/citation.cfm?id=2060702 > Publication Date: 2011.

(Continued)

*Primary Examiner* — Hares Jami
(74) *Attorney, Agent, or Firm* — Alston & Bird LLP (57) ABSTRACT

An approach is provided for providing data access via multi-user views. An access management platform determines at least one view of data, wherein the at least one view is created based on one or more queries with one or more projections in one or more monadic elements to the data. The access management platform further determines one or more policies for accessing the data, wherein the one or more policies specify at least one or more access capabilities. The access management platform also causes storage of the one or more policies, the one or more access capabilities, or a combination thereof in the one or more monadic elements. The access management platform further causes granting of access to the at least one view by one or more requesting devices, wherein the granting of the access is determined by processing of the one or more monadic elements.

20 Claims, 7 Drawing Sheets

(56) References Cited

OTHER PUBLICATIONS

Toczek et al. "Another take on functional system-level design and modeling." IEEE Forum on Specification and Design Languages, 2009. FDL 2009. Sophia Antipolis, France, Sep. 22-24, 2009, 6 pages.
International Search Report and Written Opinion for corresponding International Application No. PCT/FI2013/050005 dated Jun. 7, 2013, 13 pages.

* cited by examiner

METHOD AND APPARATUS FOR PROVIDING DATA ACCESS VIA MULTI-USER VIEWS

BACKGROUND

Service providers and device manufacturers (e.g., wireless, cellular, etc.) are continually challenged to deliver value and convenience to consumers by, for example, providing compelling network services and access to various kinds of information. These services are leading to vast amounts of data (structured and binary) which need to be managed, stored, searched, analyzed, etc. Over the last decade, the internet services have accumulated data in the range of exabytes ($10^{16}$ bytes). Although most of this data is not structured in nature, however, it must be stored, searched and analyzed appropriately before any real time information can be drawn from it for providing services to the users. Furthermore, several access policies can be enforced for reading, writing or updating the data.

In order to optimize data access paths and number of reads (disk accesses), Internet-scale applications often use denormalized (e.g., redundant) data models. These data models provide indices (referred to as views) to data for optimization purposes. The views are often pre-computed or generated from a more general normalized (e.g., non-redundant) data structure (referred as master data). Both the master data and views can be thought as security boundaries. Whenever data is crossing a boundary, an access control check is required. For example, when an agent makes an access request to master data, an access control check is performed to determine whether the agent is allowed to access the data.

However, if no trust relationship is established between a view and the master data, the view is forced to be a single user view, as the access control has to be enforced when the data leaves from the master storage. As a result, in situations where many users share access to the same data, as is often the case, this will lead to a high volume of duplicated data, since each user is required to have their own views.

SOME EXAMPLE EMBODIMENTS

Therefore, there is a need for an approach for providing data access via multi-user views.

According to one embodiment, a method comprises determining at least one view of data, wherein the at least one view is created based, at least in part, on one or more queries with one or more projections in one or more monadic elements to the data. The method also comprises determining one or more policies for accessing the data, wherein the one or more policies specify at least one or more access capabilities. The method further comprises causing, at least in part, a storage of the one or more policies, the one or more access capabilities, or a combination thereof in the one or more monadic elements. The method also comprises causing, at least in part, a granting of access to the at least one view by one or more requesting devices, wherein the granting of the access is determined by processing and/or facilitating a processing of the one or more monadic elements to determine whether the one or more requesting devices have the one or more access capabilities.

According to another embodiment, an apparatus comprises at least one processor, and at least one memory including computer program code for one or more computer programs, the at least one memory and the computer program code configured to, with the at least one processor, cause, at least in part, the apparatus to determine at least one view of data, wherein the at least one view is created based, at least in part, on one or more queries with one or more projections in one or more monadic elements to the data. The apparatus is also caused to determine one or more policies for accessing the data, wherein the one or more policies specify at least one or more access capabilities. The apparatus is further caused to cause, at least in part, a storage of the one or more policies, the one or more access capabilities, or a combination thereof in the one or more monadic elements. The apparatus is also caused to cause, at least in part, a granting of access to the at least one view by one or more requesting devices, wherein the granting of the access is determined by processing and/or facilitating a processing of the one or more monadic elements to determine whether the one or more requesting devices have the one or more access capabilities.

According to another embodiment, a computer-readable storage medium carries one or more sequences of one or more instructions which, when executed by one or more processors, cause, at least in part, an apparatus to determine at least one view of data, wherein the at least one view is created based, at least in part, on one or more queries with one or more projections in one or more monadic elements to the data. The apparatus is also caused to determine one or more policies for accessing the data, wherein the one or more policies specify at least one or more access capabilities. The apparatus is further caused to cause, at least in part, a storage of the one or more policies, the one or more access capabilities, or a combination thereof in the one or more monadic elements. The apparatus is also caused to cause, at least in part, a granting of access to the at least one view by one or more requesting devices, wherein the granting of the access is determined by processing and/or facilitating a processing of the one or more monadic elements to determine whether the one or more requesting devices have the one or more access capabilities.

According to another embodiment, an apparatus comprises means for determining at least one view of data, wherein the at least one view is created based, at least in part, on one or more queries with one or more projections in one or more monadic elements to the data. The apparatus also comprises means for determining one or more policies for accessing the data, wherein the one or more policies specify at least one or more access capabilities. The apparatus further comprises means for causing, at least in part, a storage of the one or more policies, the one or more access capabilities, or a combination thereof in the one or more monadic elements. The apparatus also comprises means for causing, at least in part, a granting of access to the at least one view by one or more requesting devices, wherein the granting of the access is determined by processing and/or facilitating a processing of the one or more monadic elements to determine whether the one or more requesting devices have the one or more access capabilities.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the foregoing method.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing data access via multi-user views are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, flow of data and process results, etc. The computation closures (e.g., a granular reflective set of instructions, data, and/or related execution context or state) provide the capability of slicing of computations for processes associated with services, applications, data access providing, device setups (e.g. provided by manufacturer), etc. and transmitting the computation slices between various devices, infrastructures, and information sources.

As used herein, the term "monad" refers to a particular style of combinator library that supports basic means of combination. A monad is a programming structure that represents computations. Monad is a kind of abstract data type constructor that encapsulates program logic instead of data in the domain model. A defined monad allows chaining of actions together and building different pipelines that process data in various steps, in which each action is decorated with additional processing rules (e.g. policies) provided by the monad. Although various embodiments are described with respect to monads, it is contemplated that the approach described herein may be used with other libraries, programming structures, etc.

Figure 1:
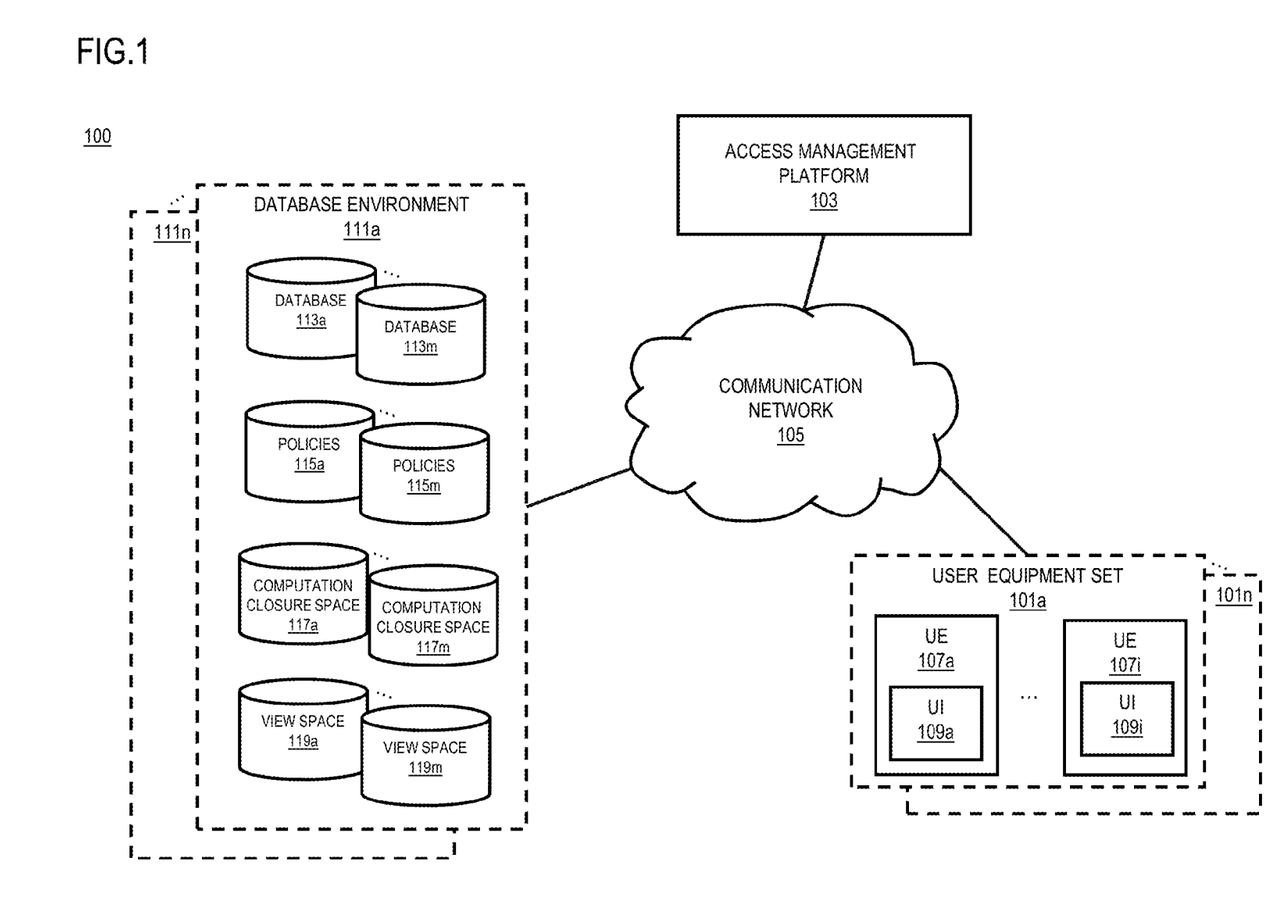
FIG. 1 is a diagram of a system capable of providing data access via multi-user views, according to one embodiment.

FIG. 1 is a diagram of a system capable of providing data access via multi-user views, according to one embodiment. In one embodiment, data is stored within the environment of multiple data base systems such as, for example, relational databases, wherein a database consists of a set of data tables. Each table of a relational database is defined as a set of tuples that have the same attributes.

In one embodiment, a view consists of a stored database query accessible by a user of the database as a virtual table. A view is not part of the physical database schema, but is a virtual table computed from data in the database based on a query.

In one embodiment, database views can be considered as queries with projections in form of monadic elements to the master data. A monadic element is typically defined as an approach for determining types of computations based on the types of their results. A monadic element may also be defined as an approach for creating computations that produce a value, or an approach through which chain computations can together produce a functional chain of computations.

In one embodiment, the policies associated with the master data are enforced through capabilities stored within the instance data. For example, user U in order to read data D, may be required (based on the database policies) to have a capability C which enables the user U to be provided with a view W that in turn can provide data D to user U. The view W is a temporary table locked to user U with capability C. Subsequently, as number of users grows, the number of views generated for those users will also grow and this growth can lead to high volumes of duplicated data as user views which requires high volumes of storage space and computational power.

To address this problem, a system 100 of FIG. 1 introduces the capability to provide data access via multi-user views. In one embodiment, the access management platform 103 replaces generating user dependent views and pre-populating the views with data, with multi-user views that include both data from databases 113a-113m and access policies from policies 115a-115m in the database environments 111a-111n. The multi-user views can be generated as chains (e.g., linked sets) of computation closures that may include data, policies, and computations from computation spaces 117a-117m, that will be executed on the data. Furthermore, the chain of computation closures can be presented as monadic elements in view space 119a-119m.

In one embodiment, monadic computation by the access management platform 103 allows simplification of access to data for users of UEs 107a-107i and compact reuse of views. Furthermore, computation closures 117a-117m enable encapsulation of data 113a-113m into computation results that are returned to the users in response to users' queries. In this embodiment, monadic computations associated with computation closures can encapsulate data together with access policies (e.g., capabilities) from policies 115a-115m into multi-user views in view space 119a-119m. As a result, there will be no need for user dependent views and instead, the multi-user views grant data access to a user only if there is a policy match and deny access otherwise.

In one embodiment, projection of certain computations associated with a query into a chain of computation closures with monadic elements, can be represented as an equivalence function of the query which is capable of generating a temporary view similar to the user dependent views generated in the traditional approach.

In one embodiment, a chain of computation closures associated with a query can provide access to the data based on the access policies included in the chain. Therefore, there will be no need for pre-populated views of data and as a result the storage space used for pre-populated views is saved.

In one embodiment, the recyclable computation closures can be extracted from previously generated computation closure chains and included in other computation closure chains with different access policies to be reused for granting data access to different users or different groups of users. In this embodiment, the data can be transferred from users to other users while the access rights of data owners are preserved.

As shown in FIG. 1, the system 100 comprises sets 101a-101n of user equipment (UEs) 107a-107i having connectivity to the access management platform 103, via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computation closures, which may affect the service, for example the bit error rate, etc. Additionally, each UI element may be bound to a context/process by granular distribution. In one embodiment, granular distribution enables processes to be implicitly or explicitly migrated between devices, computation clouds, and other infrastructure. Additionally, a UE 107a-107i may be a mobile device with embedded Radio Frequency (RF) tag system of device to device connections such that computational operations and content can be locally transmitted among devices.

By way of example, the UEs 107a-107i, and the access management platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
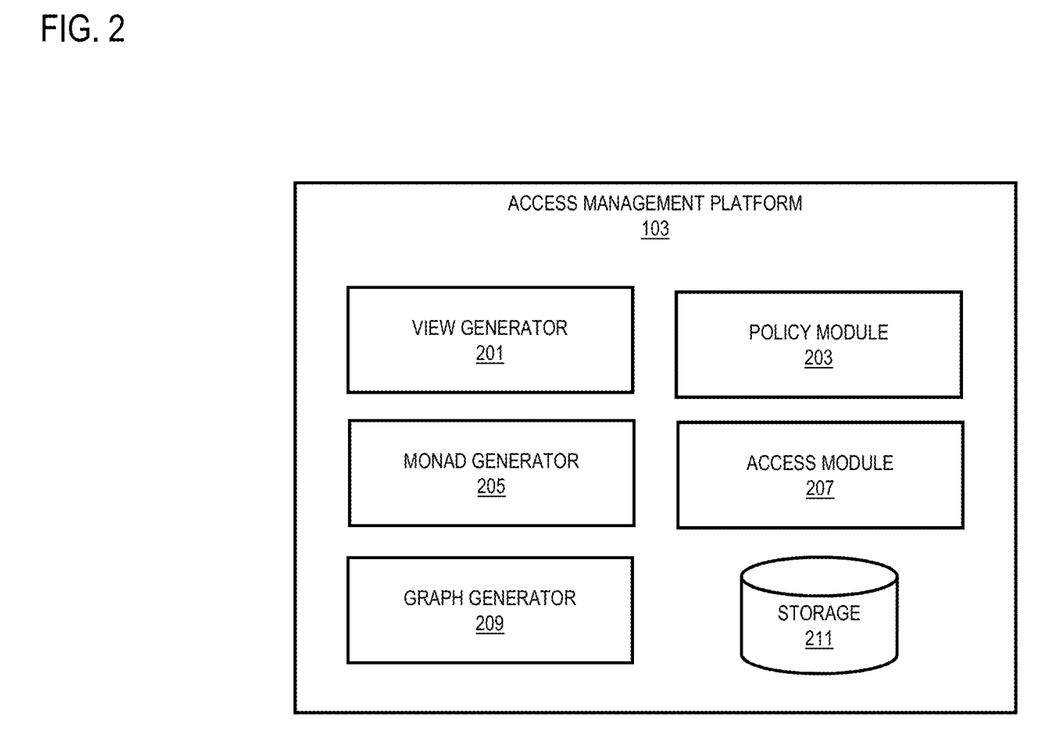
FIG. 2 is a diagram of the components of access management platform, according to one embodiment.

FIG. 2 is a diagram of the components of the access management platform 103, according to one embodiment. By way of example, the access management platform 103 includes one or more components for providing data access via multi-user views. It is contemplated that the functions of these components may be combined in one or more components or performed by other components of equivalent functionality. In this embodiment, the access management platform 103 includes a view generator 201, a policy module 203, a monad generator 205, an access module 207, a graph generator 209, and a storage 211.

Figure 3:
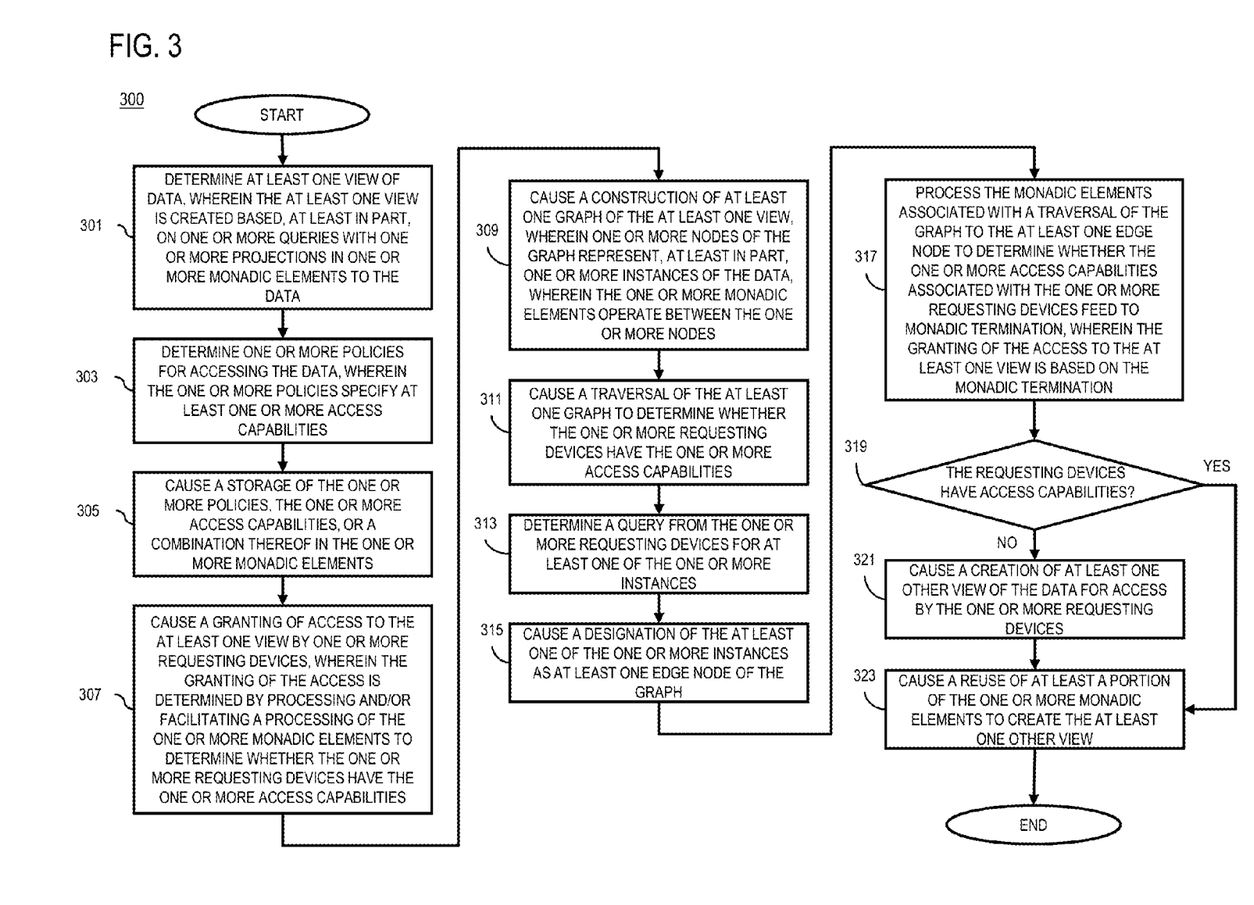
FIG. 3 is a flowchart of a process for providing data access via multi-user views, according to one embodiment.
Figure 6:
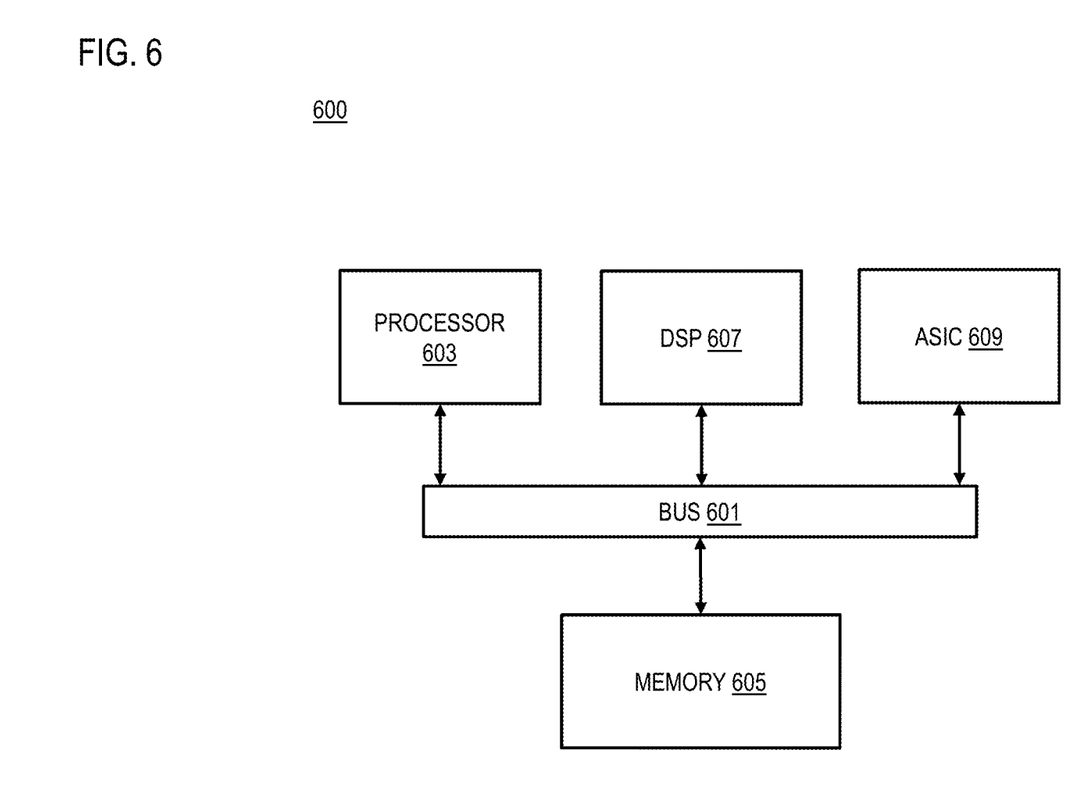
FIG. 6 is a diagram of a chip set that can be used to implement an embodiment of the invention.

FIG. 2 is described with respect to FIG. 3, wherein FIG. 3 is a flowchart of a process for providing data access via multi-user views, according to one embodiment. In one embodiment, the access management platform 103 performs the process 300 and is implemented in, for instance, a chip set including a processor and a memory as shown in FIG. 6.

In one embodiment, in step 301, the view generator 201 determines at least one view of data, wherein the at least one view is created based, at least in part, on one or more queries provided by a user of a UE 107a1-107i with one or more projections in one or more monadic elements associated with the data of database 113a-113m.

In one embodiment, per step 303 of FIG. 3, the policy module 203 determines one or more policies from policies 115a-115m for accessing the data, wherein the one or more policies specify at least one or more access capabilities for the user of UE 107a-107i.

In one embodiment, per step 305 of FIG. 3, the monad generator 205 causes, at least in part, a storage of the one or more policies, the one or more access capabilities, or a combination thereof in the one or more monadic elements. In one embodiment, the one or more monadic elements may include, at least in part, one or more computation closures from computation closure spaces 117a-117m associated with enforcing the one or more policies, determining the one or more access capabilities, or a combination thereof.

In one embodiment, the one or more monadic elements including the one or more computation closures, the one or more policies, the one or more access capabilities, or a combination thereof may be stored in view spaces 119a-119m, in storage 211, or a combination thereof.

In one embodiment, per step 307 of FIG. 3, the access module 207 causes, at least in part, a granting of access to the at least one view stored in view spaces 119a-119m by one or more requesting UEs 107a-107i, wherein the granting of the access is determined by processing and/or facilitating a processing of the one or more monadic elements to determine whether the one or more requesting UEs 107a-107i have the one or more access capabilities.

In one embodiment, per step 309 of FIG. 3, the graph generator 209 causes, at least in part, a construction of at least one graph of the at least one view from the view space 119a-119m, wherein one or more nodes of the graph represent, at least in part, one or more instances of the data and the one or more monadic elements operate between the one or more nodes. For example, nodes $N_1$ and $N_2$ of graph G may represent two locations (e.g. addresses of two points of interest) and the edge $E_{12}$ of the graph from node N1 to node $N_2$ may represent a monadic element representing a route from location $N_1$ to location $N_2$.

In one embodiment, per step 311 of FIG. 3, the graph generator 209 causes, at least in part, a traversal of the at least one graph to determine whether the one or more requesting UEs 107a-107i have the one or more access capabilities. For example, if the initial query by a user of UE 107a-107i is regarding a driving direction from point $A_1$ (with address $N_1$) to point $A_2$ (with address $N_2$) the traverse of graph G by the graph generator 209 determines whether the user has access capability to the route between points $A_1$ and $A_2$ (represented by edge $E_{12}$). In this example, the points $A_1$ and $A_2$ may be restricted locations not available to the public but only to a certain group of people. If the user has the access capability, the route data will be provided to the user.

In one embodiment, per step 313 of FIG. 3, the graph generator 209 determines a query from the one or more requesting UE 107a-107i for at least one of the one or more instances of data such as $N_1$ or $N_2$.

In one embodiment, per step 315 of FIG. 3, the graph generator 209 causes, at least in part, a designation of the at least one of the one or more instances as at least one node of the graph. Subsequently, per step 317 of FIG. 3, the graph generator 209 processes and/or facilitates a processing of the one or more monadic elements associated with a traversal of the graph to the at least one node to determine whether the one or more access capabilities associated with the one or more requesting UEs 107a-107i feed to monadic termination, wherein the granting of the access to the at least one view is based, at least in part, on the monadic termination. In the above example, for a user of UE 107a-107i with no access capability to locations $A_1$ and $A_2$, the process of edge $E_{12}$ may terminate the monadic computation for providing a route between points $A_1$ and $A_2$ to the UE 107a-107i.

In one embodiment, per step 319 of FIG. 3, the view generator 201 determines whether the one or more requesting UEs 107a-107i have the one or more access capabilities. If the users do not have the access capability, per step 321 of FIG. 3, the view generator 201 causes, at least in part, a creation of at least one other view of the data for access by the one or more requesting UEs 107a-107i. For example, if the UE 107a-107i has no access capability to points $A_1$ and $A_2$, the view generator 201 may create a view for providing the driving direction to some other points $B_1$ and $B_2$ respectively in the vicinity of $A_1$ and $A_2$ where the UE 107a-107i has access capability to.

In one embodiment, per step 323 of FIG. 3, the view generator 210 causes, at least in part, a reuse of at least a portion of the one or more monadic elements to create the at least one other view. For example, at least a portion of the monadic elements from edge $E_{12}$ may be used for creating a view for providing access to the driving direction from point $B_1$ to point $B_2$ to a UE 107a-107i that has originally requested a driving direction from point $bA_1$ to $A_2$ that it did not have access capability to.

In one embodiment, the reuse of the at least a portion of the one or more monadic elements is based, at least in part, on a determination of whether the one or more requesting UEs 107a-107i share one or more users, one or more systems, one or more domains, or a combination thereof with one or more other UEs 107a-107i that requested the at least one view.

Figure 4:
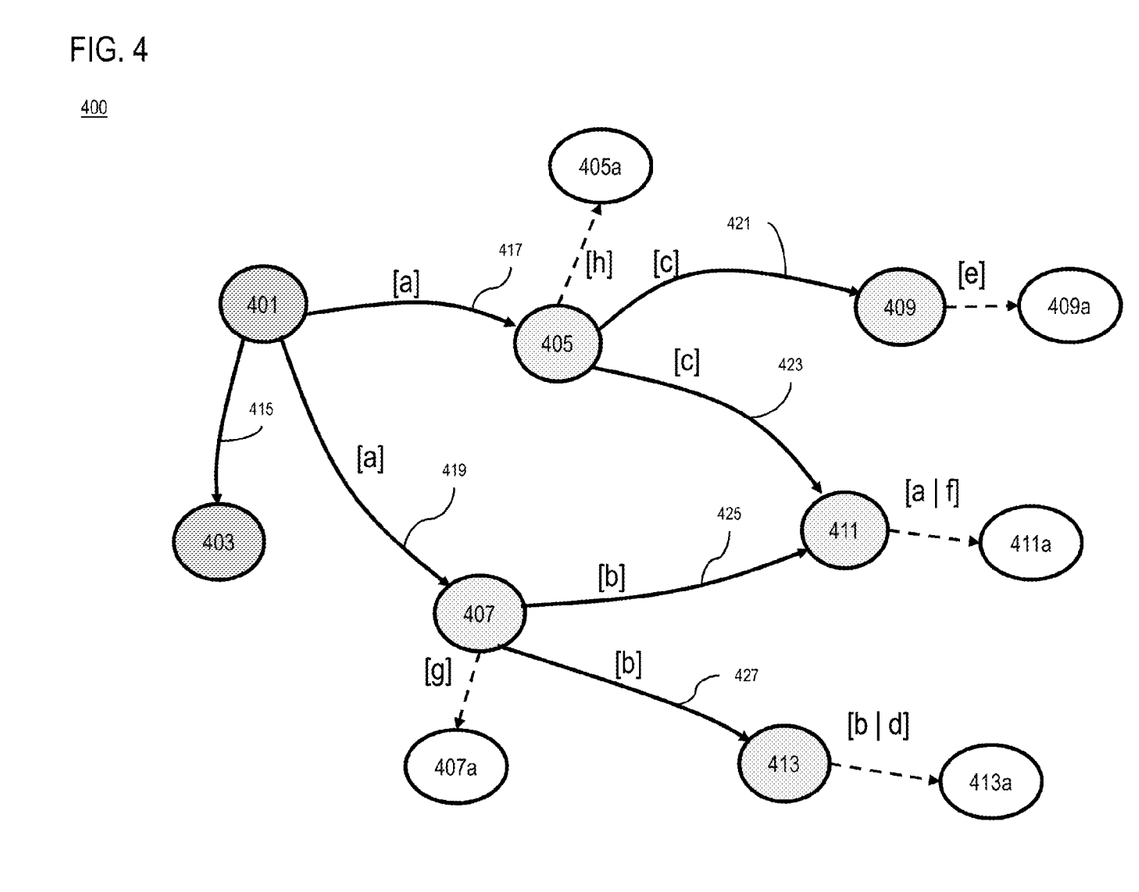
FIG. 4 is a diagram of monadic operators, according to one embodiment.

FIG. 4 is a diagram of monadic operators, according to one embodiment. In one embodiment a view 400 of FIG. 4 can be considered as queries with projections in monadic elements to the master data 113a-113m. The master data policies 115a-115m are enforced through capabilities. For example, in order to read data D, a user of a UE 107a-107i may need to have a capability C feed to monadic termination represented at the edges of graph 400. The data D can be an edge in the graph 400, for example a Resource Description Framework (RDF) graph, and the query can be considered as graph traversal/matching.

In one embodiment, in order to be able to read the de-normalized data from a view 400 a user of UE 107a-107i may need to have access to the full query and the relationships between the nodes, not only the payload of the de-normalized data. Therefore, monadic operators between the graph nodes will be computed using the computation closures 117a-117m associated with each monadic operation.

In one embodiment, access to data 113a-113m is granted to the UE 107a-107i only if the results from execution of computation closures 117a-117m representing monadic elements that apply the policies 115a-115m associated with the data 113a-113m, show that the UE 107a-107i have access capability to the data 113a-113m.

In one embodiment, in the example of FIG. 4, the graph 400 represents relations 417, 419, 421, 423, 425, and 427 between every two subjects 405, 407, 409, 411, and 413. For example, subjects 405, 407, 409, 411, and 413 may be people and relations 421, 423, 425, and 427 may show friendship among those people. Furthermore, node 401 is the starting node of the graph and node 403, connected to node 401 by edge 415, represents the type of the graph (e.g. RDF) Furthermore, nodes 405a, 407a, 409a, 411a, and 413a represent attributes associated with nodes 405, 407, 409, 411, and 413 such as, for example, name, age, address, etc.

In one embodiment, alphabetical letters in brackets such as [a], [b], [c], [e], [h], and [g], [b|d], and [a|f] represent the requesting user's access capabilities required in order to be able to access the requested data. The capabilities shown as [b|d] mean b or d, for example, users with capabilities b or d will be able to access attribute 413a of node 413.

TABLE 1

| Nodes | Edges | Access Capabilities |
|---|---|---|
| 401, 405a, 409a | [417, 421] | [a, h, c, e] |
| 401, 405a, 411a | [417, 423] | [a, h, c] |
| 401, 407a, 411a | [419, 425] | [a, g, b] |
| 401, 407a, 413a | [419, 427] | [a, g, b] |

In one embodiment, a query may have been submitted by a user of a UE 107a-107i requesting friends of friends for subjects 405a, 407a, 409a, 411a, and 413a in a database 113a-113m. The monadic relations representing relationship among nodes 405a, 407a, 409a, 411a, and 413a as traversed from the starting node 401 can be presented as Table 1.

In one embodiment, a monadic chain of computation closures representing the above query and including the corresponding terminators for access control can be presented as follows and stored in view spaces 119a-119m:

AMonad term=([ ] ( ) { });

AccessTerm1[a, h, c, e](405a, 409a){401};

AccessTerm2[a, h, c](405a, 411a){401};

AccessTerm3[a, g, b](407a, 411a){401};

AccessTerm4[a, g, b](407a, 413a){401}  (1)

The representation (1) above shows, on the first line, the term format following four access terms, wherein each access term includes a set of capabilities, in square brackets [ . . . ], drawn from policies 115a-115m; a set of data nodes from the databases 113a-113m, in parentheses ( . . . ); and a pointer to the graph, in curly braces { . . . } identifying the graph in view space 119a-119m.

Furthermore, a monadic chain (1) includes computation closures from closure spaces 117a-117m associated with each term (not shown), wherein execution of these computation closures will lead to the processing of the query and providing an answer to the query.

The processes described herein for providing data access via multi-user views may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
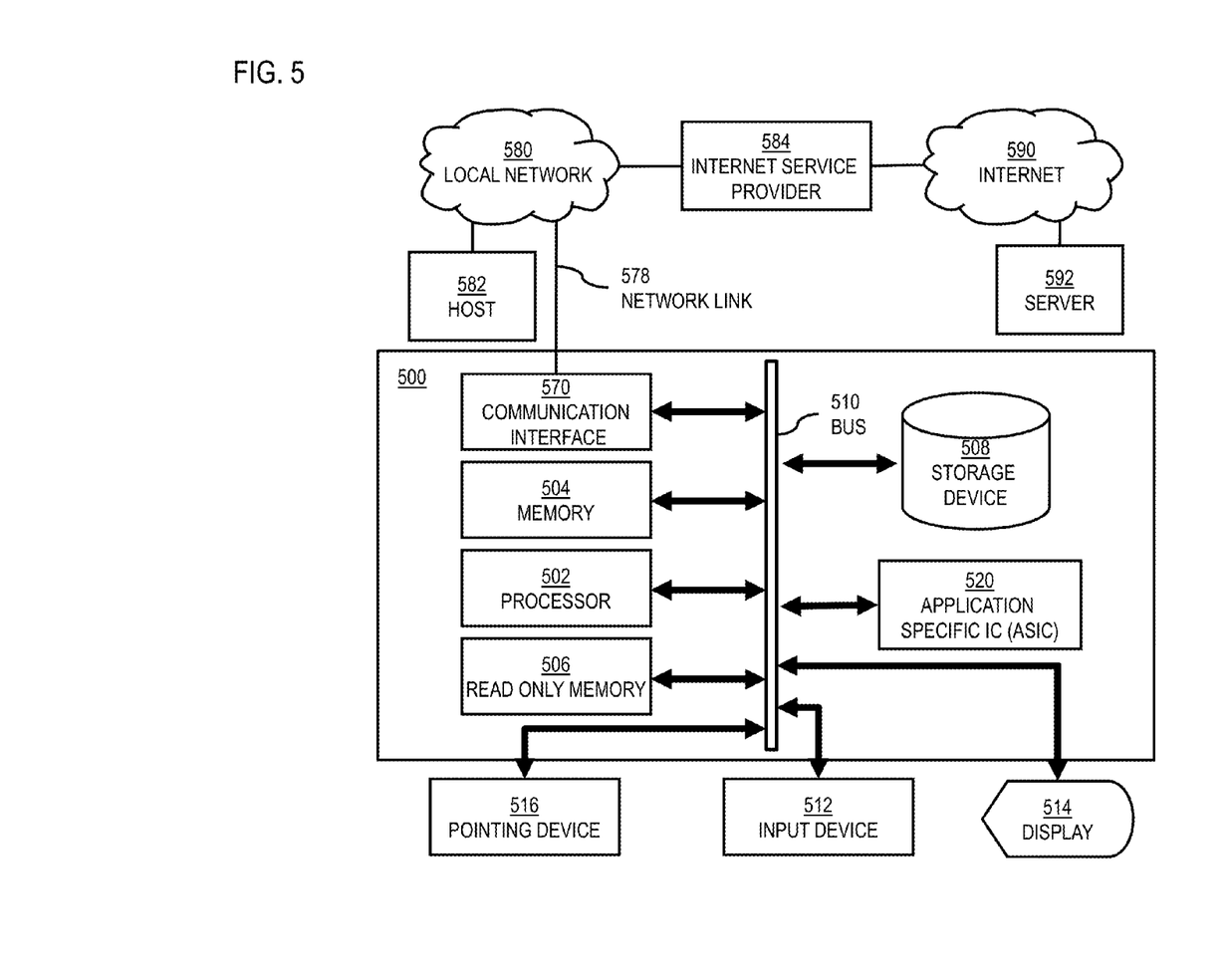
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide data access via multi-user views as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing data access via multi-user views.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to providing data access via multi-user views. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for providing data access via multi-user views. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing data access via multi-user views, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing data access via multi-user views to the UEs 107a-107i.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to provide data access via multi-user views as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of providing data access via multi-user views.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide data access via multi-user views. The memory 605 also stores the data associated with or generated by the execution of the inventive steps.

Figure 7:
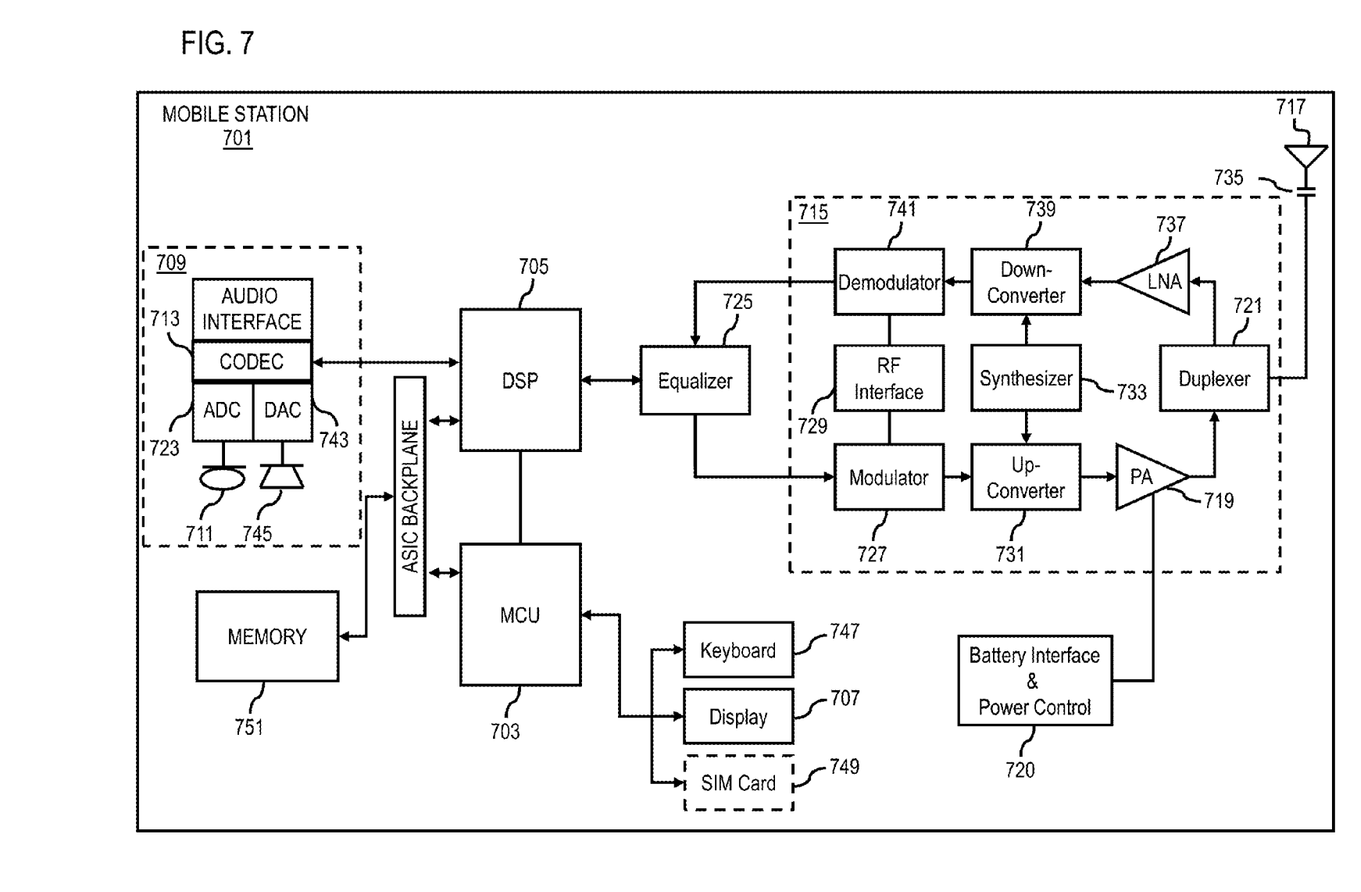
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of providing data access via multi-user views. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing data access via multi-user views. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to provide data access via multi-user views. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    at least one determination of at least one view of data, wherein the at least one view is created based, at least in part, on one or more queries with one or more projections in one or more monadic elements to the data;
    one or more policies for accessing the data, wherein the one or more policies specify at least one or more access capabilities;
    a storage of the one or more policies, the one or more access capabilities, or a combination thereof in the one or more monadic elements; and
    a granting of access to the at least one view by one or more requesting devices, wherein the granting of the access is determined by processing and/or facilitating a processing of the one or more monadic elements to determine whether the one or more requesting devices have the one or more access capabilities.

2. A method of claim 1, wherein the (1) data and/or (2) information and/or (3) at least one signal are further based, at least in part, on the following:
    a construction of at least one graph of the at least one view,
    wherein one or more nodes of the graph represent, at least in part, one or more instances of the data; and
    wherein the one or more monadic elements operate between the one or more nodes.

3. A method of claim 2, wherein the (1) data and/or (2) information and/or (3) at least one signal are further based, at least in part, on the following:
    a traversal of the at least one graph to determine whether the one or more requesting devices have the one or more access capabilities.

4. A method of claim 2, wherein the (1) data and/or (2) information and/or (3) at least one signal are further based, at least in part, on the following:
    at least one determination of a query from the one or more requesting devices for at least one of the one or more instances;
    a designation of the at least one of the one or more instances as at least one node of the graph; and
    a processing of the one or more monadic elements associated with a traversal of the graph to the at least one node to determine whether the one or more access capabilities associated with the one or more requesting devices feed to monadic termination,
    wherein the granting of the access to the at least one view is based, at least in part, on the monadic termination.

5. A method of claim 1, wherein the (1) data and/or (2) information and/or (3) at least one signal are further based, at least in part, on the following:
    at least one determination that the one or more requesting devices do not have the one or more access capabilities; and
    a creation of at least one other view of the data for access by the one or more requesting devices.

6. A method of claim 5, further comprising:
    a reuse of at least a portion of the one or more monadic elements to create the at least one other view.

7. A method of claim 6, wherein the reuse of the at least a portion of the one or more monadic elements is based, at least in part, on a determination of whether the one or more requesting devices share one or more users, one or more systems, one or more domains, or a combination thereof with one or more other devices that requested the at least one view.

8. A method of claim 1, wherein the one or more monadic elements include, at least in part, one or more computation closures associated with enforcing the one or more policies, determining the one or more access capabilities, or a combination thereof.

9. An apparatus comprising:
    at least one processor; and
    at least one memory including computer program code for one or more programs,
    the at least one memory and the computer program code configured to, with the at least one processor, cause the apparatus to perform at least the following, determine at least one view of data, wherein the at least one view is created based, at least in part, on one or more queries with one or more projections in one or more monadic elements to the data;

determine one or more policies for accessing the data, wherein the one or more policies specify at least one or more access capabilities;

cause, at least in part, a storage of the one or more policies, the one or more access capabilities, or a combination thereof in the one or more monadic elements; and cause, at least in part, a granting of access to the at least one view by one or more requesting devices, wherein the granting of the access is determined by processing and/or facilitating a processing of the one or more monadic elements to determine whether the one or more requesting devices have the one or more access capabilities.

10. An apparatus of claim 9, wherein the apparatus is further caused to:

cause, at least in part, a construction of at least one graph of the at least one view, wherein one or more nodes of the graph represent, at least in part, one or more instances of the data; and wherein the one or more monadic elements operate between the one or more nodes.

11. An apparatus of claim 10, wherein the apparatus is further caused to:

cause, at least in part, a traversal of the at least one graph to determine whether the one or more requesting devices have the one or more access capabilities.

12. An apparatus of claim 10, wherein the apparatus is further caused to:

determine a query from the one or more requesting devices for at least one of the one or more instances;

cause, at least in part, a designation of the at least one of the one or more instances as at least one node of the graph; and process and/or facilitate a processing of the one or more monadic elements associated with a traversal of the graph to the at least one node to determine whether the one or more access capabilities associated with the one or more requesting devices feed to monadic termination, wherein the granting of the access to the at least one view is based, at least in part, on the monadic termination.

13. An apparatus of claim 9, wherein the apparatus is further caused to:

determine that the one or more requesting devices do not have the one or more access capabilities; and cause, at least in part, a creation of at least one other view of the data for access by the one or more requesting devices.

14. An apparatus of claim 13, wherein the apparatus is further caused to:

cause, at least in part, a reuse of at least a portion of the one or more monadic elements to create the at least one other view.

15. An apparatus of claim 14, wherein the reuse of the at least a portion of the one or more monadic elements is based, at least in part, on a determination of whether the one or more requesting devices share one or more users, one or more systems, one or more domains, or a combination thereof with one or more other devices that requested the at least one view.

16. An apparatus of claim 9, wherein the one or more monadic elements include, at least in part, one or more computation closures associated with enforcing the one or more policies, determining the one or more access capabilities, or a combination thereof.

17. A non-transitory computer-readable storage medium carrying one or more sequences of one or more instructions which, when executed by one or more processors, cause an apparatus to perform at least the following:

determining at least one view of data, wherein the at least one view is created based, at least in part, on one or more queries with one or more projections in one or more monadic elements to the data;

determining one or more policies for accessing the data, wherein the one or more policies specify at least one or more access capabilities;

causing, at least in part, a storage of the one or more policies, the one or more access capabilities, or a combination thereof in the one or more monadic elements; and causing, at least in part, a granting of access to the at least one view by one or more requesting devices, wherein the granting of the access is determined by processing and/or facilitating a processing of the one or more monadic elements to determine whether the one or more requesting devices have the one or more access capabilities.

18. A non-transitory computer-readable storage medium of claim 17 wherein the apparatus is caused to further perform:

causing, at least in part, a construction of at least one graph of the at least one view, wherein one or more nodes of the graph represent, at least in part, one or more instances of the data; and wherein the one or more monadic elements operate between the one or more nodes.

19. A non-transitory computer-readable storage medium of claim 17 wherein the apparatus is caused to further perform:

causing, at least in part, a traversal of the at least one graph to determine whether the one or more requesting devices have the one or more access capabilities.

20. A non-transitory computer-readable storage medium of claim 17 wherein the apparatus is caused to further perform:

determining a query from the one or more requesting devices for at least one of the one or more instances;

causing, at least in part, a designation of the at least one of the one or more instances as at least one node of the graph; and processing and/or facilitating a processing of the one or more monadic elements associated with a traversal of the graph to the at least one node to determine whether the one or more access capabilities associated with the one or more requesting devices feed to monadic termination, wherein the granting of the access to the at least one view is based, at least in part, on the monadic termination.

\* \* \* \* \*